(12) United States Patent
Ishii

(10) Patent No.: US 8,706,151 B2
(45) Date of Patent: Apr. 22, 2014

(54) USER EQUIPMENT TERMINAL AND SIGNAL POWER MEASUREMENT METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 521 days.

(21) Appl. No.: 12/740,161

(22) PCT Filed: Oct. 21, 2008

(86) PCT No.: PCT/JP2008/069047
§ 371 (c)(1), (2), (4) Date: Jun. 17, 2010

(87) PCT Pub. No.: WO2009/057481
PCT Pub. Date: May 7, 2009

(65) Prior Publication Data
US 2010/0255833 A1 Oct. 7, 2010

(30) Foreign Application Priority Data
Oct. 30, 2007 (JP) ................................. 2007-282440

(51) Int. Cl.
H04W 24/00 (2009.01)
(52) U.S. Cl.
USPC .......................................... 455/522; 370/318
(58) Field of Classification Search
USPC .......................................... 455/522; 370/318
See application file for complete search history.

(56) References Cited

U.S. PATENT DOCUMENTS

| | | | |
|---|---|---|---|
| 2005/0272375 A1* | 12/2005 | Ramesh ........................ | 455/67.11 |
| 2007/0115796 A1* | 5/2007 | Jeong et al. ..................... | 370/203 |
| 2008/0101280 A1* | 5/2008 | Gholmieh et al. ............ | 370/328 |
| 2009/0010229 A1* | 1/2009 | Kazmi et al. .................. | 370/336 |
| 2009/0147748 A1* | 6/2009 | Ofuji et al. ..................... | 370/330 |
| 2013/0165145 A1* | 6/2013 | Alles et al. ................. | 455/456.1 |

FOREIGN PATENT DOCUMENTS

| | | | |
|---|---|---|---|
| JP | 2007-068180 A | | 3/2007 |
| JP | 2007-258845 A | | 10/2007 |
| JP | 2011-142664 A | | 7/2011 |
| WO | 2007/091858 A2 | | 8/2007 |

OTHER PUBLICATIONS

International Search Report w/translation from PCT/JP2008/069047 dated Dec. 22, 2008 (3 pages).
Written Opinion from PCT/JP2008/069047 dated Dec. 22, 2008 (3 pages).
TSG-RAN Working Group 4 (Radio) meeting #44 bis, R4-071781; TR 36.804 V0.8.0 (Oct. 2007); Ericsson; Shanghai, China; Oct. 8-12, 2007 (1 page) (corresponds to 3GPP TR36.804 V0.8.0).
3GPP TR 36.804 V0.8.0; "Evolved Universal Terrestrial Radio Access E-UTRA), Base Station (BS) radio transmission and reception"; Oct. 2007 (56 pages) (corresponds to R4-071781).

(Continued)

Primary Examiner — Bobbak Safaipour
(74) Attorney, Agent, or Firm — Osha Liang LLP

(57) ABSTRACT

A user equipment terminal for measuring signal power in a neighbor cell within a predetermined bandwidth includes a measurement band determining unit configured to determine a measurement band according to a measurement pattern in which the measurement band varies depending on a measurement time; a measurement unit configured to measure instantaneous values of signal power in the neighbor cell within the determined measurement band; and an averaging unit configured to average the measured instantaneous values of signal power to determine signal power in the neighbor cell.

4 Claims, 8 Drawing Sheets

(56) References Cited

OTHER PUBLICATIONS

3GPP TR 36.803 V0.6.0; "Evolved Universal Terrestrial Radio Access (E-UTRA), User Equipment (UE) radio transmission and reception"; Sep. 2007 (67 pages).
3GPP TS 36.214 V8.0.0; "Evolved Universal Terrestrial Radio Access (E-UTRA), Physical layer"; Sep. 2007 (10 pages).
Office Action for Japanese Patent Application No. 2009-539018 dated Sep. 4, 2012, with English translation thereof (4 pages).
Patent Abstract for Japanese Publication No. 2007-068180 published Mar. 15, 2007 (1 page).
Patent Abstract for Japanese Publication No. 2011-142664 published Jul. 21, 2011 (1 page).
Office Action in corresponding Japanese Patent Application No. 2009-539018 issued May 20, 2013, with translation (4 pages).

\* cited by examiner

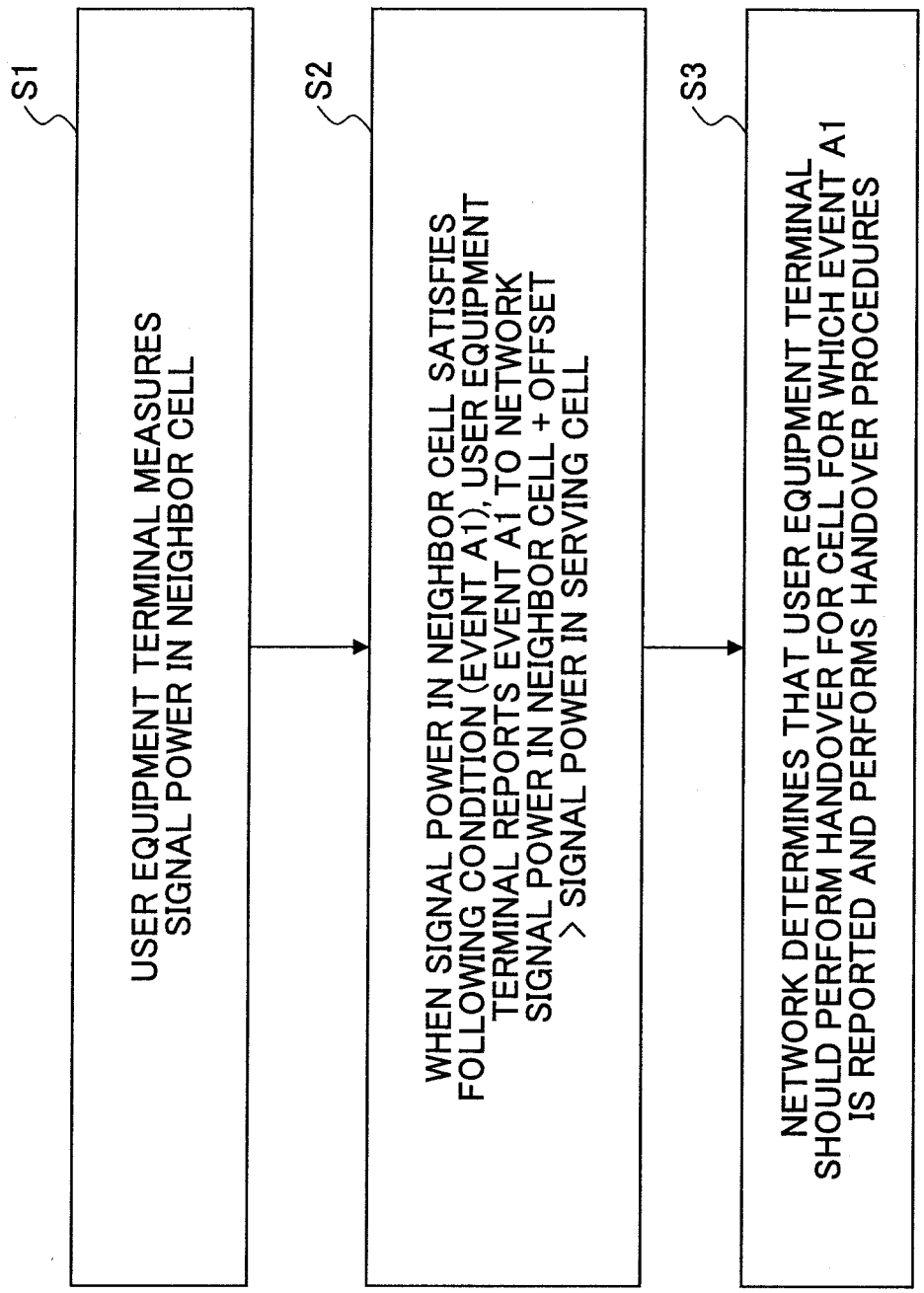

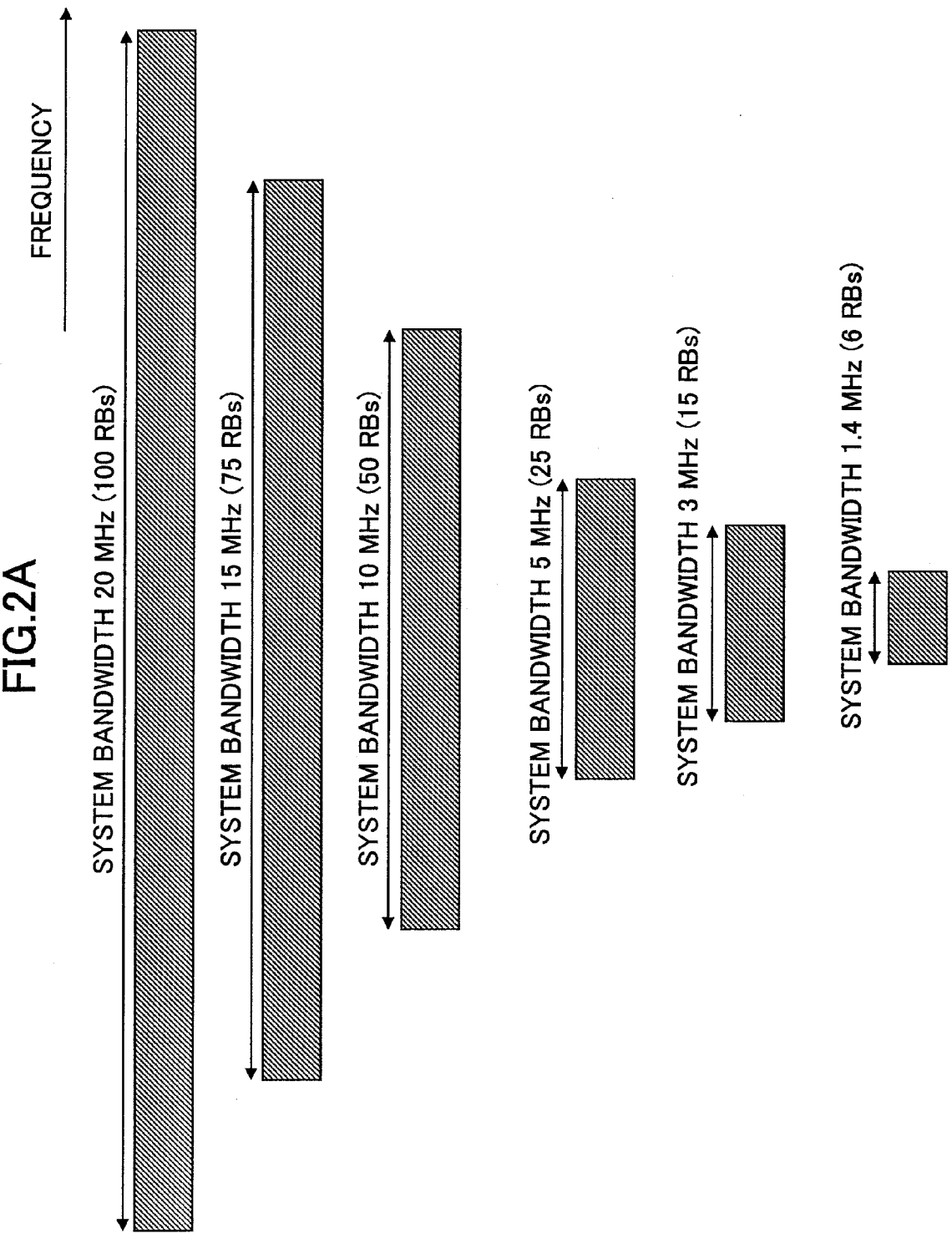

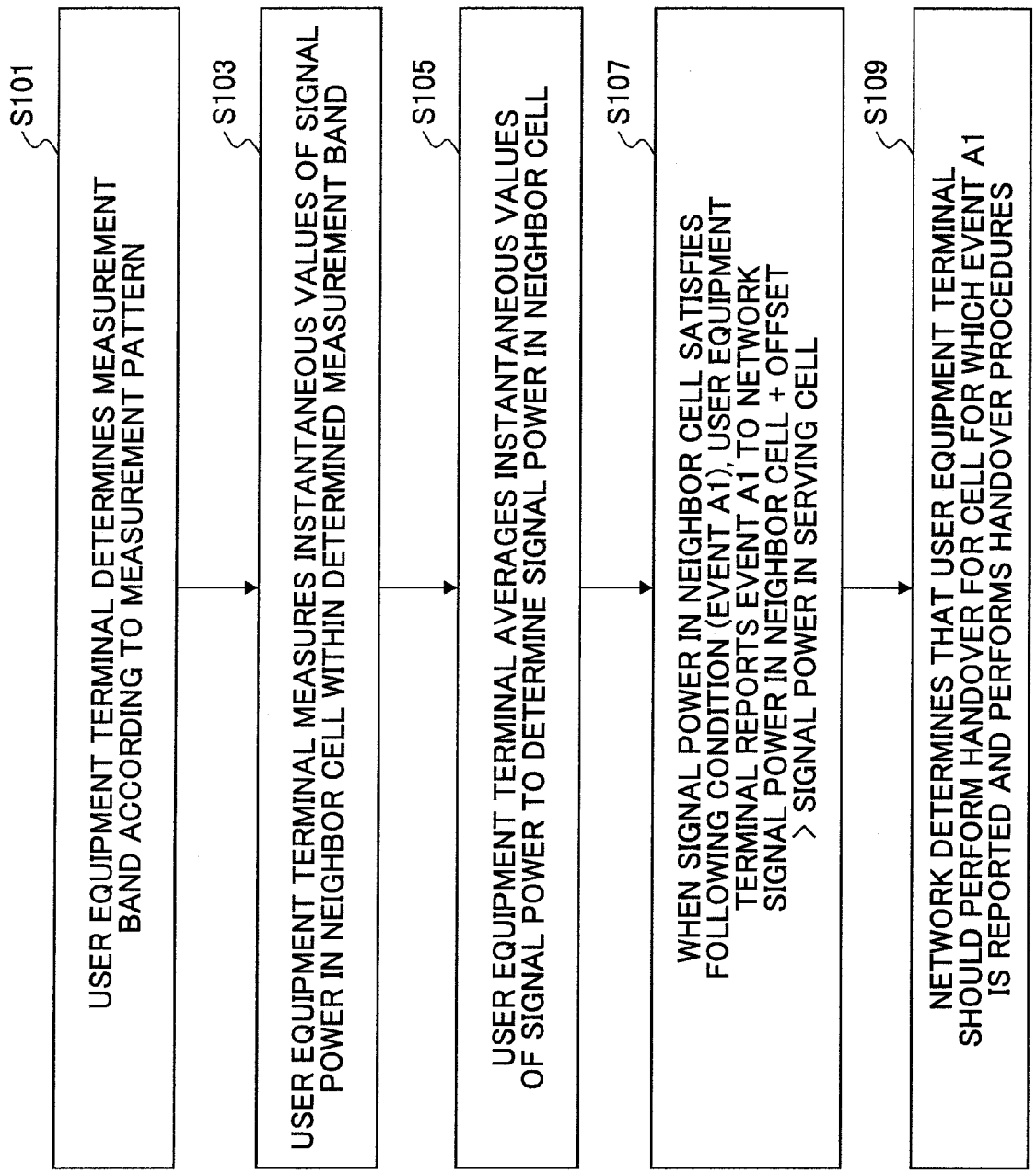

USER EQUIPMENT TERMINAL AND SIGNAL POWER MEASUREMENT METHOD

TECHNICAL FIELD

The present invention relates to a user equipment terminal and a signal power measurement method.

BACKGROUND ART

In a mobile communication system including plural cells, when a user equipment terminal (UE: user equipment) moves from one cell to another, the user equipment terminal switches to the other cell to continue communications. The switching to the other cell is referred to as handover. Typically, when the user equipment terminal moves to a neighbor cell and signal strength in the neighbor cell is higher than signal strength in the serving cell (cell in which the user equipment terminal originally performs communications), the user equipment terminal performs handover to the neighbor cell.

Specifically, the user equipment terminal performs handover according to the procedure shown in FIG. 1.

First, the user equipment terminal measures signal power in the neighbor cell (S1). Then, the user equipment terminal determines whether the signal power in the neighbor cell satisfies the following condition.

signal power in the neighbor cell+offset>signal power in the serving cell

When this condition is satisfied, the user equipment terminal reports an event (Event A1) to the network (base station) (S2). It should be noted that the offset is provided so as to avoid frequent handover to the neighbor cell from the serving cell at the cell boundary. The offset may be a positive value or a negative value. When the network receives the event (Event A1), the network determines that the user equipment terminal should perform handover to the cell for which the event is reported, and then performs handover procedures (S3). While the event is defined as Event A1, the event may be defined as any other event such as Event A3.

Quality in handover has a significant influence on communication quality in the mobile communication system. In particular, the measurement accuracy and the measurement time interval in step S1 relate to quality in handover. More specifically, when the measurement time interval is short and the measurement accuracy is high, handover can be quickly performed even though the user equipment terminal moves fast. Thus, the failure of handover can be avoided. In another case, when the measurement accuracy is high, handover to a wrong cell can be avoided. As a result, the failure of handover can be avoided.

Handover in an LTE (Long Term Evolution) system, which is a succeeding system of the W-CDMA (Wideband Code Division Multiple Access) system or the HSDPA (High Speed Downlink Packet Access) system, is described below in detail. As shown in FIG. 2A, a variable system bandwidth ranging from six resource blocks (RBs) to one hundred resource blocks can be used in the LTE system, depending on capabilities of the base station and the user equipment terminal. For example, the system bandwidth of six resource blocks, fifty resource blocks, or one hundred resource blocks may be used. The resource block is a single transmission unit in the frequency direction. The frequency bandwidth of one resource block is equal to 180 kHz (see TR 36.804, V0.8.0, Section 5.1 and TR 36.803, V0.7.0, Section 5.1). In the LTE system, the system bandwidth is also referred to as a channel bandwidth.

In the LTE system, RSRP (Reference Signal Received Power) is used for a handover criterion (see TS 36.214, V8.0.0, Section 5.1.1). Other than RSRP, RS-SIR (Reference Signal Signal-to-Interference Ratio), E-UTRA Carrier RSSI (Received Signal Strength Indicator), RSRQ (Reference Signal Received Quality), or the like may be used for the handover criterion.

FIG. 2B shows a conceptual diagram of measurement of RSRP in the case where the system bandwidth is equal to 20 MHz (one hundred resource blocks). The user equipment terminal may measure RSRP within the bandwidth of six resource blocks, within the bandwidth of fifty resource blocks, or within the bandwidth of one hundred resource blocks.

DISCLOSURE OF INVENTION

Problem(S) to be Solved by the Invention

Typically, received power significantly varies (instantaneous level fluctuations occur) as the user equipment terminal moves. Such fluctuations are referred to as Rayleigh fading. For measurement of RSRP, it is necessary to average and remove level fluctuations due to Rayleigh fading. Since the interval in the frequency domain used for the averaging process in measurement within a wider bandwidth is greater than that in measurement within a narrower bandwidth, the effect of level fluctuations due to Rayleigh fading can be accurately removed by the measurement within the wider bandwidth. Thus, RSRP can be accurately measured. In this manner, when RSRP is measured within a wider bandwidth, predetermined accuracy can be achieved with the averaging process in a shorter time interval. On the other hand, when RSRP is measured within a narrower bandwidth, the predetermined accuracy will be achieved with the averaging process in a longer time interval.

For example, in the LTE system supporting a variable system bandwidth ranging from 1.4 MHz to 20 MHz, a synchronization channel and a physical broadcast channel are transmitted using six resource blocks at the center of the system band. In other words, six resource blocks at the center of the system band are always used regardless of the system bandwidth. Thus, it is possible to measure RSRP in these six resource blocks, as shown in FIG. 3. Specifically, even though the neighbor cell supports the system bandwidth of one hundred resource blocks, the user equipment terminal measures RSRP in six resource blocks at the center of the system band. However, measurement of RSRP within such a narrow bandwidth needs a longer measurement time interval, and thus quality in handover may be degraded.

In order to achieve higher quality in handover, it is desirable that measurement of RSRP be performed with a wider bandwidth. However, measurement with a wider bandwidth may increase or complicate processing in the user equipment terminal. Specifically, in order to perform measurement with a wider bandwidth, the user equipment terminal needs to perform measurement for the neighbor cell while communicating in the serving cell. For this reason, an FFT (Fast Fourier Transform) processing unit for measurement for the neighbor cell is needed in addition to an FFT processing unit for receiving signals in the serving cell. The scale of the FFT processing unit, i.e. the cost or complexity, increases with the increase in the measurement bandwidth.

In view of this problem, it is a general object of the present invention to provide a user equipment terminal and a signal power measurement method for accurately measuring signal power in the neighbor cell while reducing processing in the user equipment terminal.

Means for Solving the Problem(s)

In one aspect of the present invention, there is provided a user equipment terminal for measuring signal power in a neighbor cell within a predetermined bandwidth, including:
a measurement band determining unit configured to determine a measurement band according to a measurement pattern in which the measurement band varies depending on a measurement time;
a measurement unit configured to measure instantaneous values of signal power in the neighbor cell within the determined measurement band; and
an averaging unit configured to average the measured instantaneous values of signal power to determine signal power in the neighbor cell.

In another aspect of the present invention, there is provided a signal power measurement method in a user equipment terminal for measuring signal power in a neighbor cell within a predetermined bandwidth, including the steps of:
determining a measurement band according to a measurement pattern in which the measurement band varies depending on a measurement time; measuring instantaneous values of signal power in the neighbor cell within the determined measurement band; and
averaging the measured instantaneous values of signal power to determine signal power in the neighbor cell.

Advantageous Effect of the Invention

According to an embodiment of the present invention, it is possible to accurately measure signal power in the neighbor cell while reducing processing in the user equipment terminal.

BRIEF DESCRIPTION OF THE DRAWINGS

FIG. 1 shows a flowchart of a handover method in a mobile communication system.
FIG. 2A shows a conceptual diagram of a variable system bandwidth.
FIG. 7 shows a flowchart of a signal power measurement and handover method in accordance with an embodiment of the present invention.

DETAILED DESCRIPTION OF THE PREFERRED EMBODIMENTS

[Description of Notations]
10 user equipment terminal
101 measurement band determining unit
103 receiving unit
105 FFT processing unit
107 averaging unit

BEST MODE OF CARRYING OUT THE INVENTION

With reference to the accompanying drawings, embodiments of the present invention are described below.

Figure 2B:
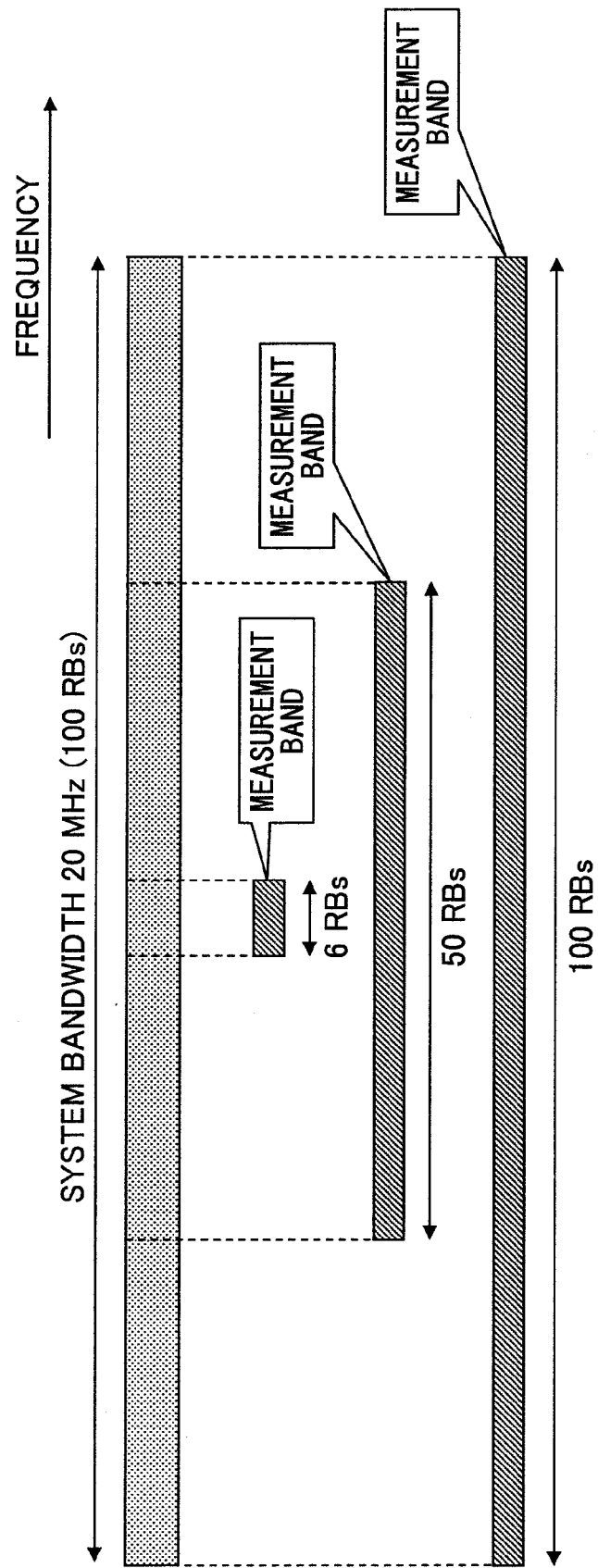
FIG. 2B shows measurement bands of signal power in user equipment terminals.
Figure 3:
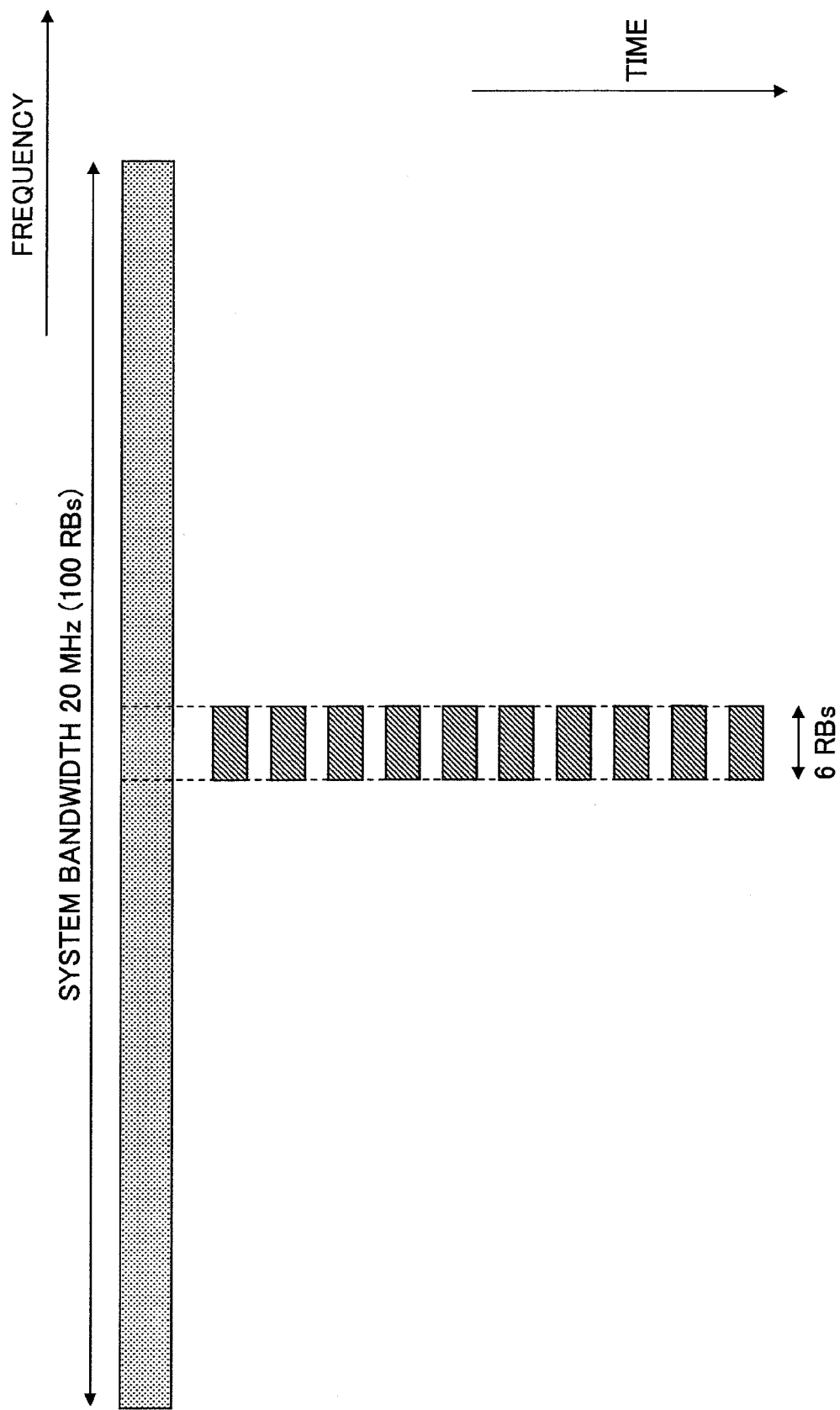
FIG. 3 shows a relationship between a measurement band and a measurement time of signal power.
Figure 4:
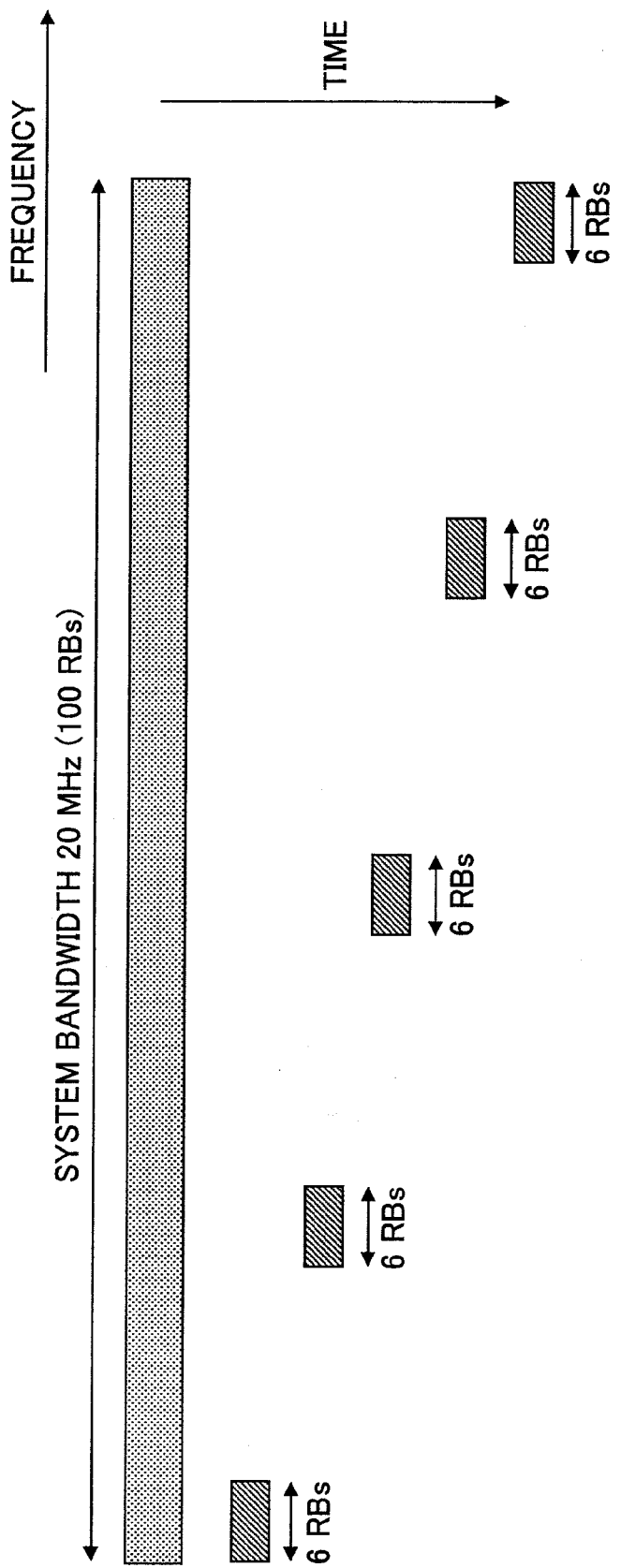
FIG. 4 shows a first relationship between a measurement band and a measurement time of signal power in accordance with an embodiment of the present invention.

FIG. 4 shows a relationship between a measurement band and a measurement time of signal power in accordance with one embodiment of the present invention. In this embodiment, in order to measure signal power in the neighbor cell, a user equipment terminal measures signal power (RSRP) within a narrower bandwidth at a single measurement time, according to a measurement pattern in which the measurement band varies depending on the measurement time.

For example, as shown in FIG. 4, the measurement bandwidth is determined to be equal to six resource blocks. The frequency of the measurement band varies depending on the measurement time. According to this embodiment, the user equipment terminal need only include an FFT processing unit for a narrow bandwidth, and thus processing in the user equipment terminal can be reduced. In addition, since the measurement band varies depending on the measurement time, the averaging process can be achieved with a wider bandwidth, and thus signal power can be accurately measured.

The measurement pattern may be any pattern in which the measurement band varies depending on the measurement time. The user equipment terminal may repeatedly use a predetermined pattern as shown in FIG. 4 or may randomly select the measurement band. While the measurement bandwidth is equal to six resource blocks in this example, the measurement bandwidth may be equal to any bandwidth. For example, the measurement bandwidth may be equal to twenty-five resource blocks and the frequency of the measurement band may vary depending on the measurement time. While the system bandwidth is equal to 20 MHz in this example, the present invention is also applicable to any other system bandwidth.

In addition, the measurement pattern may vary depending on the bandwidth of the measurement band. For example, when signal power in twenty-five resource blocks may be measured with a lower measurement frequency within a predetermined time interval, compared to the case where signal power in six resource blocks is measured. In this manner, the measurement pattern may be a pattern in which a measurement frequency decreases with an increase in the bandwidth of the measurement band.

Figure 5:
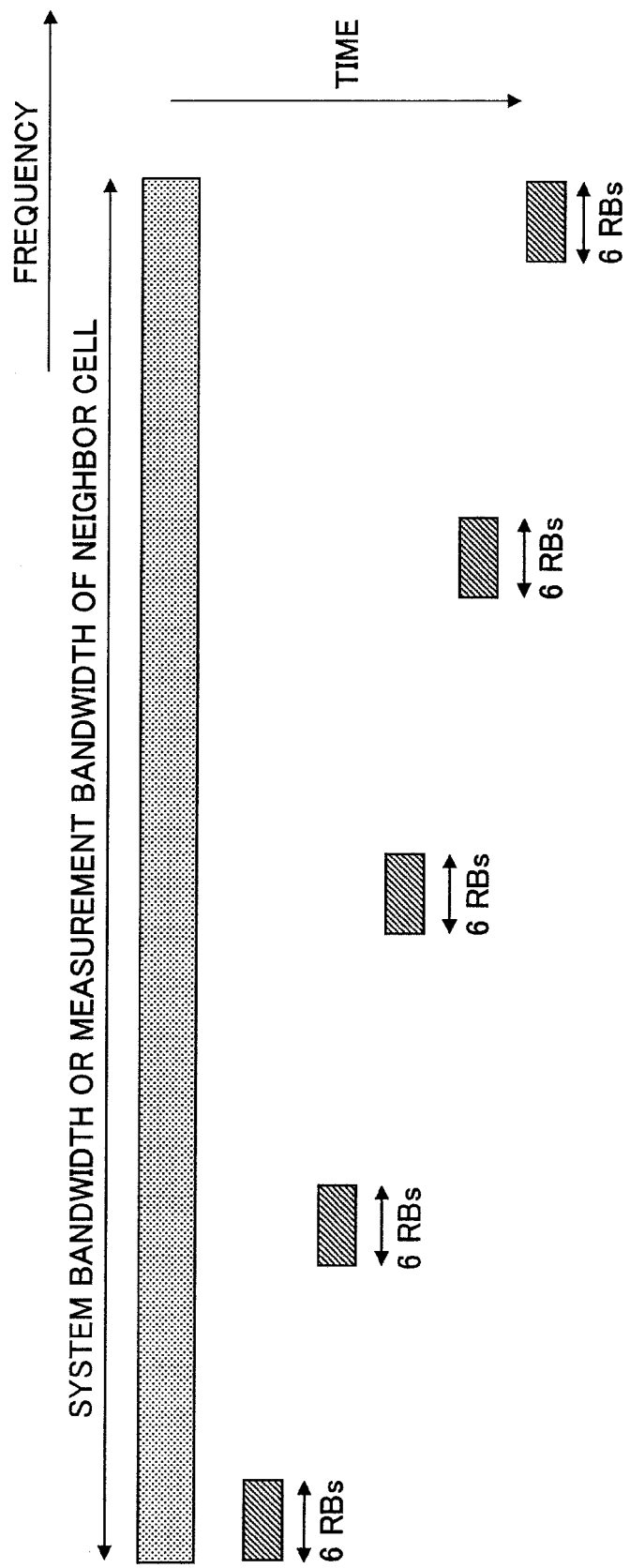
FIG. 5 shows a second relationship between a measurement band and a measurement time of signal power in accordance with an embodiment of the present invention.

FIG. 5 shows a relationship between a measurement band and a measurement time of signal power in accordance with another embodiment of the present invention. In FIG. 4, the measurement pattern is used in which the measurement band varies within the system bandwidth. In FIG. 5, a measurement pattern is used in which the measurement band varies either within the system bandwidth of the neighbor cell or within a measurement bandwidth (a bandwidth within which measurement is to be performed) for the neighbor cell, which is reported from the network (base station). For example, the system bandwidth of the neighbor cell or the measurement bandwidth for the neighbor cell may be reported as broadcast information or via an RRC message or the like which is dedicatedly transmitted to the user equipment terminal.

More specifically, the system bandwidth of the neighbor cell or the measurement bandwidth for the neighbor cell may be reported from the network (base station) as a parameter called 'measurementBandwidth'. The value of 'measurementBandwidth' may be six, fifteen, twenty-five, fifty, seventy-five, or one hundred corresponding to the number of resource blocks. When the parameter 'measurementBandwidth' is not reported, the system bandwidth of the neighbor cell or the measurement bandwidth for the neighbor cell may be the same as the downlink system bandwidth of the serving cell. Alternatively, when the parameter 'measurementBandwidth' is not reported, the system bandwidth of the neighbor cell or the measurement bandwidth for the neighbor cell may be a predetermined default value.

While RSRP is used for measurement in these embodiments, any other value such as RSRQ, RSSI, or RS-SIR may be used for measurement.

While these embodiments focus on measurement for handover for the neighbor cell during communications with the network (base station), i.e. measurement in the RRC connected state, the present invention is also applicable to measurement for the neighbor cell in the idle state. It should be noted that measurement for the neighbor cell in the idle state is performed for the purpose of cell reselection, for example.

<Configuration of a User Equipment Terminal>

Figure 6:
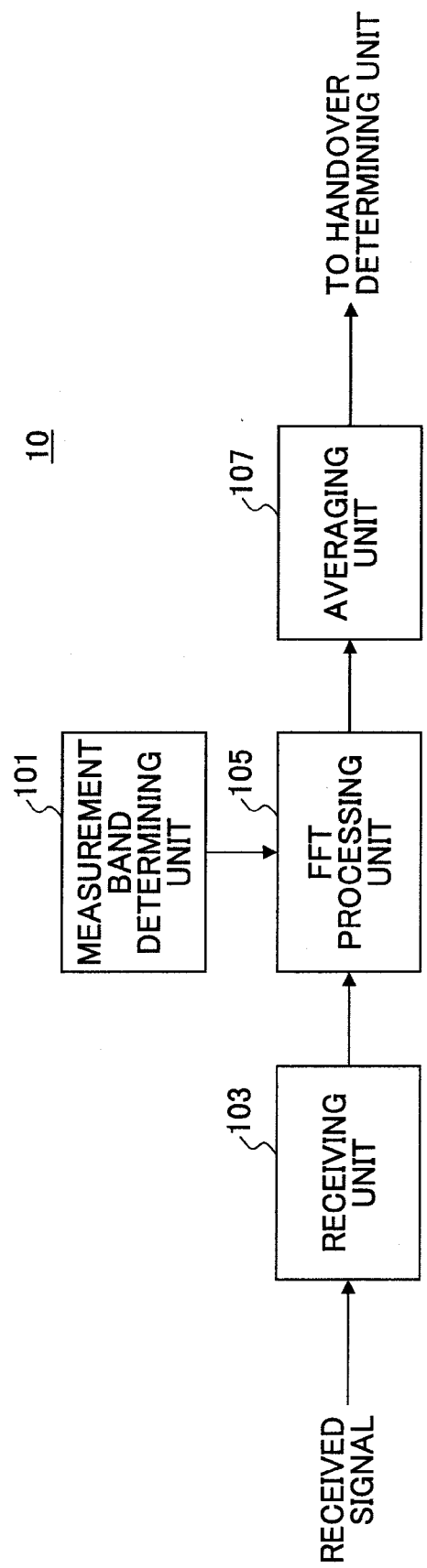
FIG. 6 shows a block diagram of a user equipment terminal in accordance with a first embodiment of the present invention.

FIG. 6 shows a block diagram of a user equipment terminal 10 in accordance with an embodiment of the present invention. The user equipment terminal 10 includes a measurement band determining unit 101, a receiving unit 103, an FFT processing unit 105, and an averaging unit 107.

The measurement band determining unit 101 determine a measurement band according to a measurement pattern in which the measurement band varies depending on a measurement time. The measurement band determining unit 101 may store a predetermined measurement pattern or randomly determine a measurement pattern.

The receiving unit 103 receives signals from the base station in the neighbor cell. The received signals include a reference signal used to measure signal power.

The FFT processing unit 105 performs FFT processing of the received signals in the neighbor cell and measures signal power of the reference signal in the neighbor cell. Since the measured signal power includes effects of Rayleigh fading and noise, this signal power is herein referred to as an instantaneous value of signal power.

The averaging unit 107 averages the instantaneous values of signal power measured by the FFT processing unit 105 to determine signal power in the neighbor cell. For example, the averaging unit 107 may average the instantaneous values of signal power measured by the FFT processing unit 105 within the averaging time interval of 200 ms in the Layer-1. The averaging unit 107 may further average, in the Layer-3, the value which is averaged in the Layer-1 according to the following equation.

$$F_n = (1-a) * F_{n-1} a * M_n$$

In this equation, 'a' is a coefficient for the averaging process in the Layer-3, '$M_n$' is the value which is averaged in the Layer-1 at the time 'n', and '$F_n$' is the value which is averaged in the Layer-3 at the time 'n'.

The user equipment terminal 10 compares signal power in the neighbor cell as described above and signal power in the serving cell, and then determines whether to perform handover.

As described with reference to FIG. 5, the receiving unit 103 may receive from the base station the system bandwidth of the neighbor cell or the measurement bandwidth for the neighbor cell as broadcast information or via an RRC message or the like which is dedicatedly transmitted to the user equipment terminal. In this case, the FFT processing unit 105 measures an instantaneous value of signal power within the system bandwidth of the neighbor cell or the measurement bandwidth for the neighbor cell.

More specifically, the system bandwidth of the neighbor cell or the measurement bandwidth for the neighbor cell may be reported from the network (base station) as a parameter called 'measurementBandwidth'. The value of 'measurementBandwidth' may be six, fifteen, twenty-five, fifty, seventy-five, or one hundred corresponding to the number of resource blocks. When the parameter 'measurementBandwidth' is not reported, the system bandwidth of the neighbor cell or the measurement bandwidth for the neighbor cell may be the same as the downlink system bandwidth of the serving cell. Alternatively, when the parameter 'measurementBandwidth' is not reported, the system bandwidth of the neighbor cell or the measurement bandwidth for the neighbor cell may be a predetermined default value.

While RSRP is used for measurement in this embodiment, any other value such as RSRQ, RSSI, or RS-SIR may be used for measurement.

While this embodiment focuses on measurement for handover for the neighbor cell during communications with the network (base station), i.e. measurement in the RRC connected state, the present invention is also applicable to measurement for the neighbor cell in the idle state. It should be noted that measurement for the neighbor cell in the idle state is performed for the purpose of cell reselection, for example.

<Flowchart of a Signal Power Measurement and Handover Method>

FIG. 7 shows a flowchart of a signal power measurement and handover method in accordance with an embodiment of the present invention.

First, the user equipment terminal determines a measurement band according to a measurement pattern in which the measurement band varies depending on a measurement time (S101). When the measurement band is determined, the user equipment terminal measures instantaneous values of signal power in the neighbor cell within the determined measurement band (S103). The user equipment terminal averages the measured instantaneous values of signal power to determine signal power in the neighbor cell (S105).

Then, the user equipment terminal determines whether the signal power in the neighbor cell satisfies the following condition.

signal power in the neighbor cell+offset>signal power in the serving cell

When this condition is satisfied, the user equipment terminal reports an event (Event A1) to the network (base station) (S107). When the network receives the event (Event A1), the network determines that the user equipment terminal should perform handover to the cell for which the event is reported, and then performs handover procedures (S109). While the event is defined as Event A1, the event may be defined as any other event such as Event A3.

As described with reference to FIG. 5, the receiving unit 103 may receive from the base station the system bandwidth of the neighbor cell or the measurement bandwidth for the neighbor cell as broadcast information or via an RRC message or the like which is dedicatedly transmitted to the user equipment terminal.

More specifically, the system bandwidth of the neighbor cell or the measurement bandwidth for the neighbor cell may be reported from the network (base station) as a parameter called 'measurementBandwidth'. The value of 'measurementBandwidth' may be six, fifteen, twenty-five, fifty, seventy-five, or one hundred corresponding to the number of resource blocks. When the parameter 'measurementBandwidth' is not reported, the system bandwidth of the neighbor cell or the measurement bandwidth for the neighbor cell may be the same as the downlink system bandwidth of the serving cell. Alternatively, when the parameter 'measurementBandwidth' is not reported, the system bandwidth of the neighbor cell or the measurement bandwidth for the neighbor cell may be a predetermined default value.

While RSRP is used for measurement in this embodiment, any other value such as RSRQ, RSSI, or RS-SIR may be used for measurement.

While this embodiment focuses on measurement for handover for the neighbor cell during communications with the network (base station), i.e. measurement in the RRC connected state, the present invention is also applicable to measurement for the neighbor cell in the idle state. It should be noted that measurement for the neighbor cell in the idle state is performed for the purpose of cell reselection, for example.

According to an embodiment of the present invention, it is possible to accurately measure signal power in the neighbor cell while reducing processing in the user equipment terminal. While the preferred embodiments of the present invention have been described, the present invention is not limited to these embodiments. Rather, the present invention can be changed or modified within the scope of the appended claims. For example, the present invention is not limited to the LTE system, but may be applied to any mobile communication system. In addition, the present invention is not limited to the mobile communication system in which the center frequency of each cell is identical, but may be applied to any mobile communication system in which center frequencies of cells may be different and different frequency measurement is performed. Furthermore, the present invention may be applied to any mobile communication system in which radio access technologies (RATs) of cells may be different and different RAT measurement is performed.

This international patent application is based on Japanese Priority Application No. 2007-282440 filed on Oct. 30, 2007, the entire contents of which are incorporated herein by reference.

The invention claimed is:

1. A user equipment terminal for measuring signal power in a neighbor cell within a predetermined bandwidth, comprising:
    a measurement band determining unit configured to determine a measurement band according to a measurement pattern in which a frequency of the measurement band having a predetermined bandwidth in a system bandwidth varies depending on a measurement time;
    a measurement unit configured to measure instantaneous values of signal power in the neighbor cell within the determined measurement band; and
    an averaging unit configured to average the measured instantaneous values of signal power to determine signal power in the neighbor cell.

2. The user equipment terminal as claimed in claim 1, further comprising:
    a bandwidth receiving unit configured to receive a system bandwidth or a measurement bandwidth of the neighbor cell from a base station; wherein
    the measurement unit measures the instantaneous values of signal power in the neighbor cell within the system bandwidth or the measurement bandwidth of the neighbor cell.

3. The user equipment terminal as claimed in claim 1, wherein:
    the measurement pattern is a pattern in which a measurement frequency decreases with an increase in a bandwidth of the measurement band.

4. A signal power measurement method in a user equipment terminal for measuring signal power in a neighbor cell within a predetermined bandwidth, comprising the steps of:
    determining a measurement band according to a measurement pattern in which a frequency of the measurement band having a predetermined bandwidth in a system bandwidth varies depending on a measurement time;
    measuring instantaneous values of signal power in the neighbor cell within the determined measurement band; and
    averaging the measured instantaneous values of signal power to determine signal power in the neighbor cell.

* * * * *